United States Patent Office 3,010,307
Patented Nov. 28, 1961

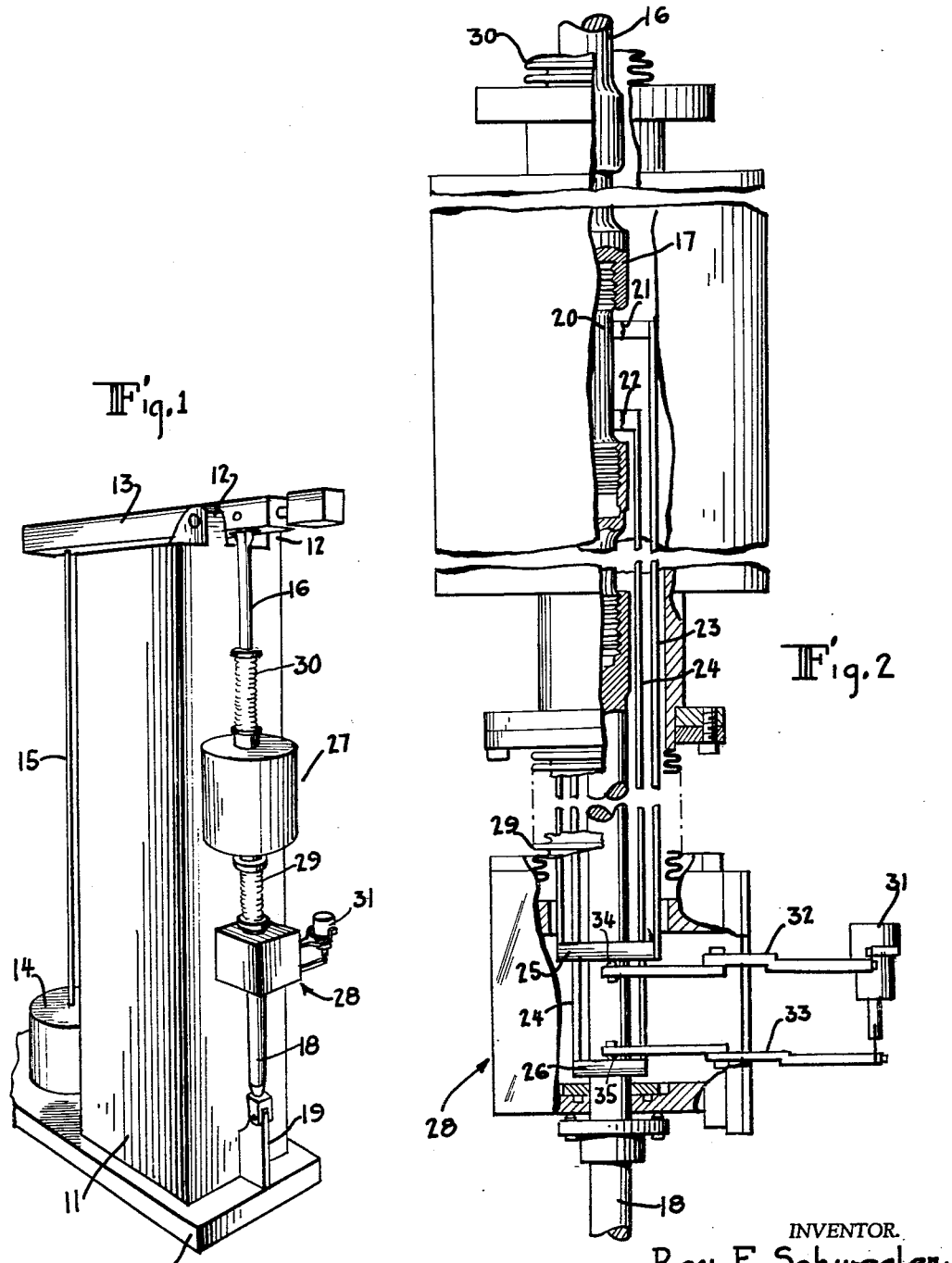

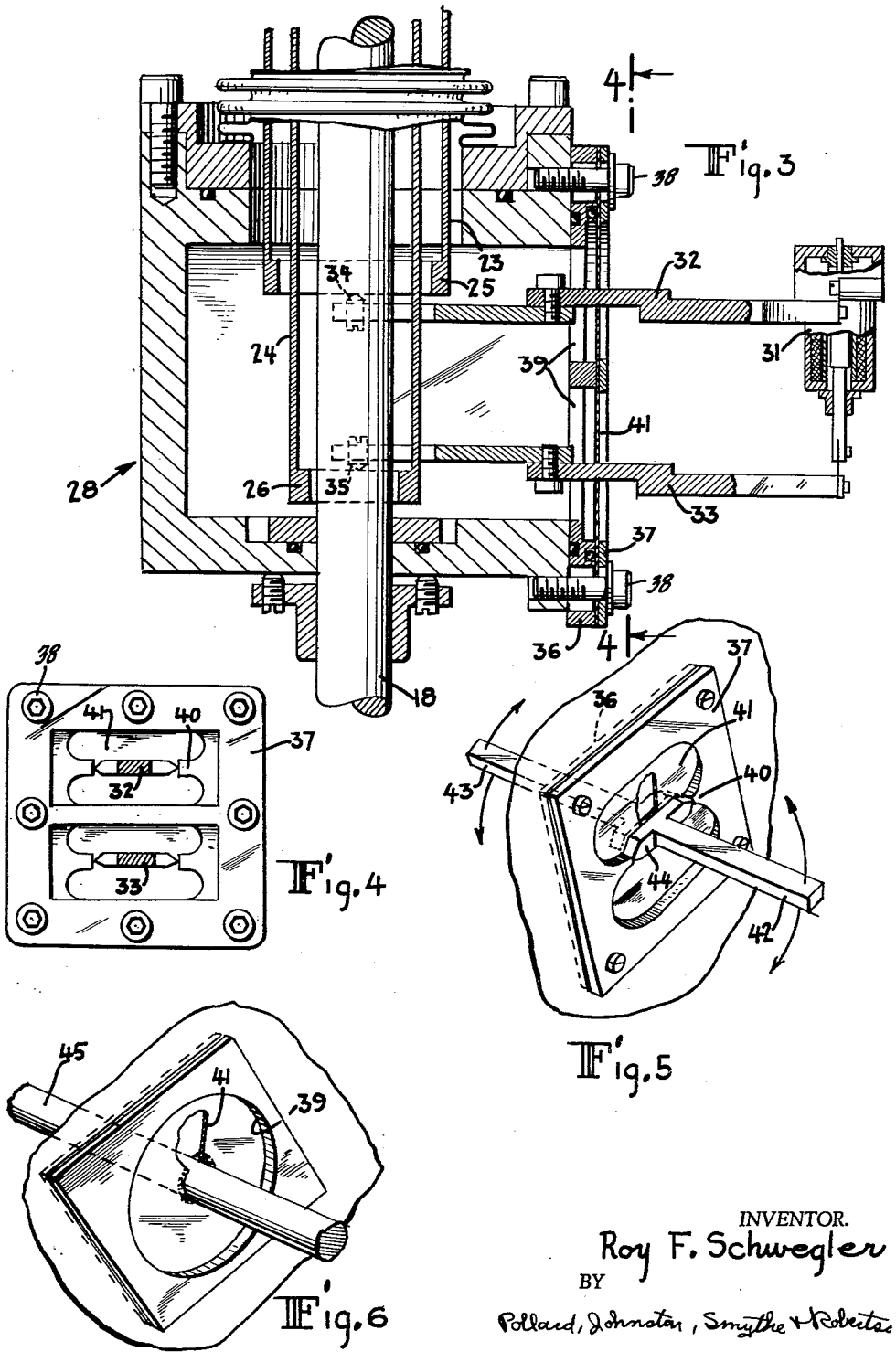

3,010,307
CREEP TESTING MACHINE
Roy F. Schwegler, Davenport, Iowa, assignor to American Machine and Metals, Inc., New York, N.Y., a corporation of Delaware
Filed July 3, 1957, Ser. No. 669,835
3 Claims. (Cl. 73—15.6)

The present invention relates to an axial loading creep and rupture machine of the type wherein the test specimen is loaded by weights acting through a lever, and more particularly to such a machine in which the specimen is loaded in a controlled atmosphere and under heat.

In previously available testing machines of this type, it has been proposed to use a differential transformer for indicating the degree of creep of the specimen. However, due to the heat in the airtight chamber in which the specimens are tested and due to the heat generated by the differential transformer itself, the life of the differential transformer was very short, and the machines were subject to many breakdowns with a consequent loss of time and an increase in the expense of operation. The present invention solves this problem by locating the differential transformer outside the chamber, so that it is segregated from the controlled atmosphere and insulated from the heat generated in the chamber.

It is an object of the present invention to provide an axial loading creep and rupture machine in which the means for indicating the degree of creep is located outside the airtight chamber in which the specimen is tested.

It is a further object of the invention to provide a novel pivotal support for a lever in the wall of an airtight chamber.

The invention is particularly adapted for use in an apparatus for the creep testing of materials in a controlled atmosphere. It includes a pair of members for gripping the ends of a test specimen and means for applying a load through the members to the specimen. Enclosing the specimen and the members is an airtight chamber within which are means for measuring the creep of the specimen. Means are provided for heating the specimen. Located outside the chamber are indicating means segregated from the controlled atmosphere and insulated from the heat generated by the heating means. Passing through and pivotally connected to a wall of the chamber in sealed relation thereto is a linkage means which connects the measuring means to the indicating means, so as to transmit movement from the measuring means to the indicating means.

In another aspect, the invention relates to a sealed mounting for transferring the motion of a lever through the surface of a plate having an aperture therein. It includes a flat flexible diaphragm overlying the aperture and sealingly secured at its periphery to the plate. Linkage means having one end on one side of the plate and the other end on the other side of the plate is pivoted at the diaphragm, so that movement at one of the ends results in a proportionally opposite movement at the other end.

These and other objects, features and advantages of the invention will become apparent from the following detailed description and drawings which are merely exemplary.

In the drawings:
FIG. 1 is a perspective view of a creep testing machine;
FIG. 2 is an enlarged elevational view, with parts broken away, of a creep testing machine incorporating some of the features of the invention;
FIG. 3 is an enlarged cross sectional view of one portion of the machine shown in FIG. 2;
FIG. 4 is a view taken along the line 5—5 of FIG. 3;
FIG. 5 is a perspective view of one form of pivotal connection; and
FIG. 6 is a perspective view of another form of pivotal connection.

As shown in the drawings, and particularly in FIGS. 1 and 2, the creep testing machine includes a base 10 and a supporting member 11 extending upwardly therefrom. Pivotally connected to extensions 12 on the upper surface of the supporting member is a horizontally extending beam 13. A free-hanging weight 14 is connected to one end of rod 15, the other end of which is connected to the rearward end of beam 13. Adjacent the other end of beam 13 and depending downwardly therefrom is a rod 16 having a specimen gripper 17 on its lower end.

Below rod 16 and axially aligned therewith is a rod 18 connected to an extension 19 on base 10. An upwardly directed specimen gripper, which is axially aligned with gripper 17 and spaced therefrom, is carried by the upper end of rod 18. A specimen 20 is held in place by the grippers by screw threading or the like, and the force exerted by weight 14 is transmitted to the specimen by the upper gripper 17 in the conventional manner.

A pair of spaced elements 21 and 22 engage the specimen on either side of its center point and record the amount of lengthening or creep of the test specimen. The movement of the elements 21 and 22 is transmitted through linkage 23 and 24, respectively, to plates or rings 25 and 26, respectively, at the lower portion of the machine. Rings 25 and 26 are formed, in any desired manner, so as to be free of rod 18.

In order to test the creep strength of materials under heat and in a controlled atmosphere, the specimen and holders are surrounded by a heating unit, designated generally at 27, and the plates are surrounded by a housing, shown generally at 28. Leakage is prevented between the heating unit 27 and the housing 28 by an airtight expandable sealing member 29 which surrounds a portion of rod 18 and the links. In order to prevent leakage from the upper end of the measuring unit another expandable sealing member 30 is provided above unit 27.

The movement or creep of specimen 20 is transmitted to a differential transformer 31, which indicates the amount of movement, through links 32 and 33 which respectively contact the lower surface of plate 25 and the upper surface of plate 26, by means of pins 34 and 35 adjacent their inner ends. The other ends of the links are connected to the differential transformer and move together a spins 34 and 35 move apart. The links are pivoted about their juncture with the right-hand wall, as viewed in FIG. 2, of the housing 28. The differential transformer is located outside housing 28, so that it is segregated from the controlled atmosphere therein and insulated from the heat generated by unit 27. If the transformer is mounted within this housing, it has been found that the combination of the heat generated by unit 27 and the heat generated by the transformer itself will have deleterious effects on the transformer.

In order to permit the links to pass through the wall of housing 28 and to be pivoted about their juncture therewith, a novel pivotal connection, shown in one of its preferred forms in FIGS. 4 and 5, has been devised. It includes a pair of flat plates 36 and 37 removably connected together and to the wall of the housing as by screws 38. Each of the plates has a pair of vertically spaced, correspondingly shaped apertures 39. Each aperture may have a generally curved side edge with inwardly extending projections 40. Mounted between the plates and overlying the apertures is a flexible membrane or diaphragm 41. Two elongated members or links 42 and 43 are secured to opposite sides of diaphragm 41. On the ends of the links are longitudinally extending heads 44 which lie so that their ends are adjacent projections 40. Thus pivotal movement of the links in any direction other than perpendicular to a line connecting the projections is prevented by the ends of the heads contacting the projections. This construction provides a leakproof pivotal connection which is inexpensive and effective.

FIG. 6 shows another form of connection in which aperture 39 is circular in shape, and in which a rod or link 45 is sealingly connected to and passes through diaphragm 41. This construction permits pivotal movement of the link in all directions, and movement of one end of the link results in a proportionally opposite movement of the other end of the lever.

In both of the preferred forms of pivotal connection the movement is transmitted because of the bending or deflection of the diaphragm to permit the desired motion.

It is clear that the shape of the link ends adjacent the membrane, the shape of the aperture, the thickness of the membrane, and the material from which it is made, may all be varied as desired to produce different results.

It is to be understood that details of construction may be varied without departing from the spirit of the invention except as defined in the appended claims.

What is claimed is:

1. In apparatus for the creep testing of materials in a controlled atmosphere, the combination comprising a pair of members for gripping the ends of a test specimen, means for applying a load through said members to said specimen, an airtight chamber enclosing said specimen and said members, means for heating said specimen, means within said chamber for sensing the creep of the specimen, a differential transformer located outside said chamber so as to be segregated from said controlled atmosphere and insulated from the heat generated by said heating means, there being an aperture in one wall of said chamber, a flexible diaphragm overlying said aperture and fixed at its periphery to said chamber, motion transmitting means directly connected at one end to said sensing means so as to transmit the motion of said sensing means to a remote point in said chamber, and linkage means passing through said diaphragm so that said linkage means is in sealed relation to said chamber and may be pivoted relative thereto, said linkage means connecting the other end of said motion transmitting means to said differential transformer so as to convert the linear movement of said motion transmitting means to angular movement and transmit said angular movement to the differential transformer.

2. In apparatus for the creep testing of materials in a controlled atmosphere, the combination comprising a pair of members for gripping the ends of a test specimen, means for applying a load through said members to said specimen, an airtight chamber enclosing said specimen and said members, means for heating said specimen, means within said chamber for sensing the creep of the specimen, a differential transformer located outside said chamber so as to be segregated from said controlled atmosphere and insulated from the heat generated by said heating means, there being an aperture in one wall of said chamber adjacent said differential transformer, a flexible diaphragm overlying said aperture and sealingly secured at its periphery to said chamber so as to close off said aperture, motion transmitting means directly connected at one end to said sensing means so as to transmit the motion of said sensing means to a remote point in said chamber, first linkage means connected at one end to one side of said diaphragm and at the other end to the other end of said motion transmitting means, and second linkage means connected at one end to the other side of said diaphragm and at the other end to said differential transformer so that movement of the sensing means is transmitted linearly by said motion transmitting means to said first linkage means and is converted by said first linkage means to angular movement which is transmitted by said second linkage means to the differential transformer.

3. In apparatus for the creep testing of materials in a controlled atmosphere, the combination comprising a pair of members for gripping the ends of a test specimen, means for applying a load through said members to said specimen, an airtight chamber enclosing said specimen and said members, means for heating said specimen, means within said chamber for sensing the creep of the specimen, a differential transformer located outside said chamber segregated from said controlled atmosphere and insulated from the heat generated by said heating means, there being an aperture in one wall of said chamber adjacent said differential transformer, a flexible diaphragm overlying said aperture and sealingly secured at its periphery to said chamber so as to close off said aperture, said aperture having a pair of enlarged portions connected by a narrow neck portion, motion transmitting means directly connected at one end to said sensing means so as to transmit the motion of said sensing means to remote point in said chamber, first linkage means connected at one end to one side of the narrow neck of said diaphragm and at the other end to the other end of said motion transmitting means, and second linkage means connected at one end to the other side of the neck of said diaphragm and at the other end to said differential transformer so that movement from the sensing means is transmitted linearly by said motion transmitting means to said first linkage means and is converted by said first linkage means to angular movement which is transmitted by said second linkage means to the differential transformer, the lever formed by said first and second linkage means pivoting about an axis formed by the narrow neck portion.

References Cited in the file of this patent

UNITED STATES PATENTS

| | | |
|---|---|---|
| 1,827,560 | Binckley | Oct. 13, 1931 |
| 1,920,971 | De Giers | Aug. 8, 1933 |
| 2,154,280 | Nadai et al. | Apr. 11, 1939 |
| 2,290,868 | Eriksson | July 28, 1942 |
| 2,375,034 | Semchyshen | May 1, 1945 |
| 2,457,320 | Rosenberger | Dec. 28, 1948 |
| 2,534,980 | Lubahn | Dec. 19, 1950 |
| 2,632,329 | Zuehlke | Mar. 24, 1953 |
| 2,748,597 | Kooistra | June 5, 1956 |

OTHER REFERENCES

Publication: Review of Scientific Instruments, vol. 27, June 1956, pages 386, 387, article by Smith et al., "High Temperature Vacuum Furnace for Tensile Testing."